US012701474B2

(12) United States Patent
Tsai et al.

(10) Patent No.: US 12,701,474 B2
(45) Date of Patent: Aug. 4, 2026

(54) METHODS AND APPARATUS TO ACTIVATE SECONDARY CELL GROUP (SCG) SELECTIVELY

(71) Applicant: MEDIATEK INC., Hsinchu (TW)

(72) Inventors: Chun-Fan Tsai, Hsinchu (TW); Li-Chuan Tseng, Hsinchu (TW); Yi-Ru Chen, Hsinchu (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/357,216

(22) Filed: Jul. 24, 2023

(65) Prior Publication Data

US 2024/0040452 A1 Feb. 1, 2024

Related U.S. Application Data

(60) Provisional application No. 63/369,976, filed on Aug. 1, 2022.

(51) Int. Cl.
*H04W 36/00* (2009.01)
(52) U.S. Cl.
CPC . *H04W 36/00837* (2018.08); *H04W 36/0069* (2018.08); *H04W 36/0072* (2013.01)
(58) Field of Classification Search
CPC ....... H04W 36/00837; H04W 36/0069; H04W 36/0072; H04W 36/362; H04W 76/15
See application file for complete search history.

(56) References Cited

U.S. PATENT DOCUMENTS

| | | | | |
|---|---|---|---|---|
| 2021/0099926 A1* | 4/2021 | Chen | ........... | H04W 36/362 |
| 2021/0105681 A1* | 4/2021 | Paladugu | ........ | H04W 36/00837 |
| 2021/0321310 A1 | 10/2021 | Latheef et al. | | |
| 2023/0079794 A1 | 3/2023 | Chen et al. | | |
| 2023/0247492 A1* | 8/2023 | Leng | ........... | H04W 36/0077 370/329 |

OTHER PUBLICATIONS

Extended European Search Report issued Dec. 22, 2023 in European Patent Application No. 23188067.5, 9 pages.
ZTE Corporation, Sanechips, "Discussion on conditional PSCell addition/change," 3GPP TSG-RAN WG2 Meeting #111, R2-2006901, Aug. 2020, XP051911776, 11 pages.

* cited by examiner

*Primary Examiner* — Charles C Jiang
*Assistant Examiner* — Rachel Elizabeth Marks
(74) *Attorney, Agent, or Firm* — Winston Hsu

(57) ABSTRACT

Aspects of the disclosure provide a method to activate secondary cell group (SCG) selectively. For example, the method can include receiving a radio resource control (RRC) reconfiguration message including first and second radio resource configurations of first and second primary secondary cells (PSCells) and conditional PSCell addition (CPA) and conditional PSCell change (CPC) triggering conditions, setting a current triggering condition to be the CPA triggering condition, evaluating the current triggering condition and determining that the first PSCell satisfies the current triggering condition, and performing a CPA step to add the first PSCell as a current SCG, updating the current triggering condition to be the CPC triggering condition, the UE still keeping the first and second radio resource configurations and the CPA and CPC triggering conditions for subsequent CPC step, without releasing the second radio resource configuration and the CPA and CPC triggering conditions associated with the second PSCell.

18 Claims, 4 Drawing Sheets

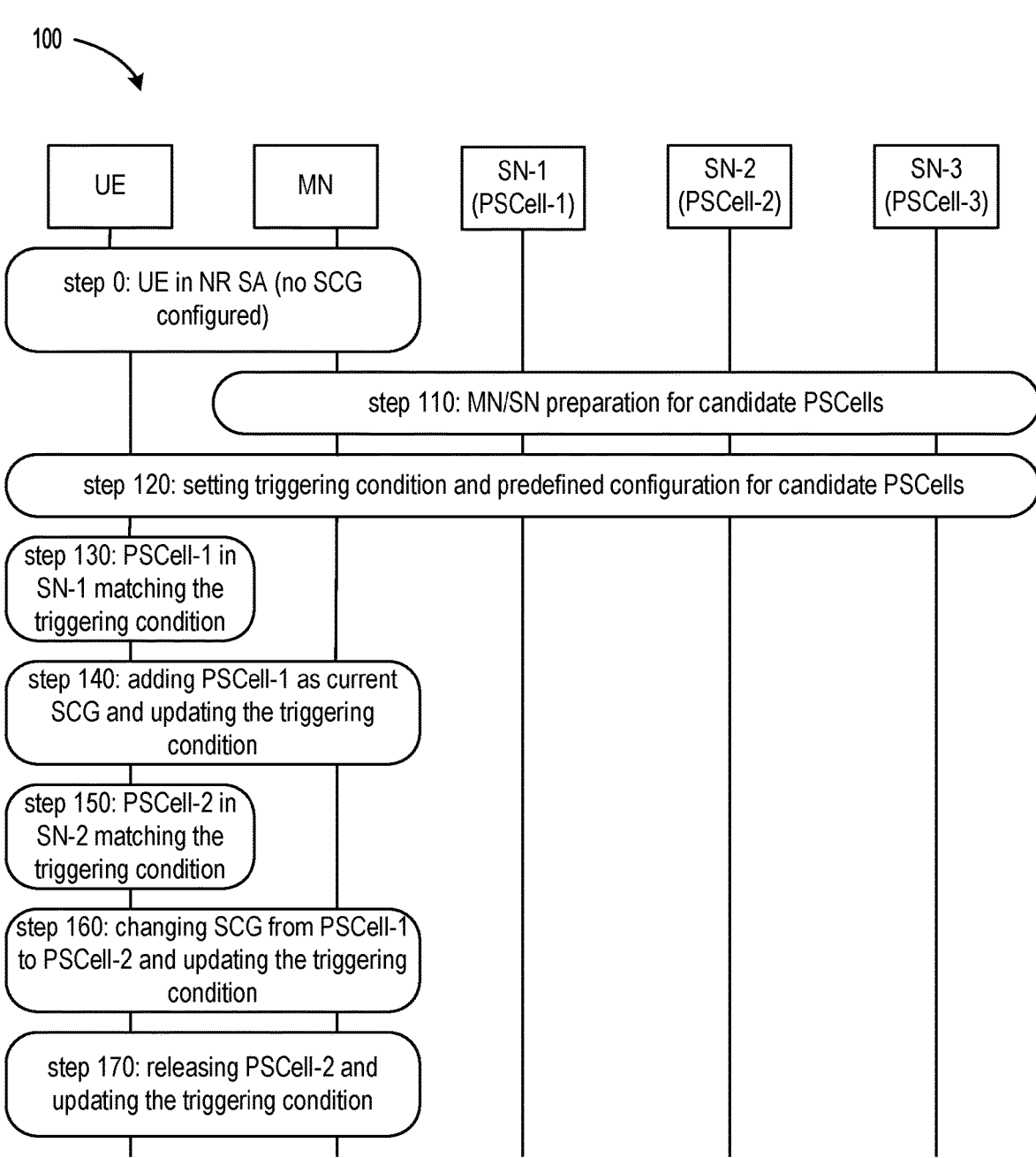

100

| UE | MN | SN-1 (PSCell-1) | SN-2 (PSCell-2) | SN-3 (PSCell-3) | step 0: UE in NR SA (no SCG configured)

step 110: MN/SN preparation for candidate PSCells step 120: setting triggering condition and predefined configuration for candidate PSCells step 130: PSCell-1 in SN-1 matching the triggering condition step 140: adding PSCell-1 as current SCG and updating the triggering condition step 150: PSCell-2 in SN-2 matching the triggering condition step 160: changing SCG from PSCell-1 to PSCell-2 and updating the triggering condition step 170: releasing PSCell-2 and updating the triggering condition

FIG. 1

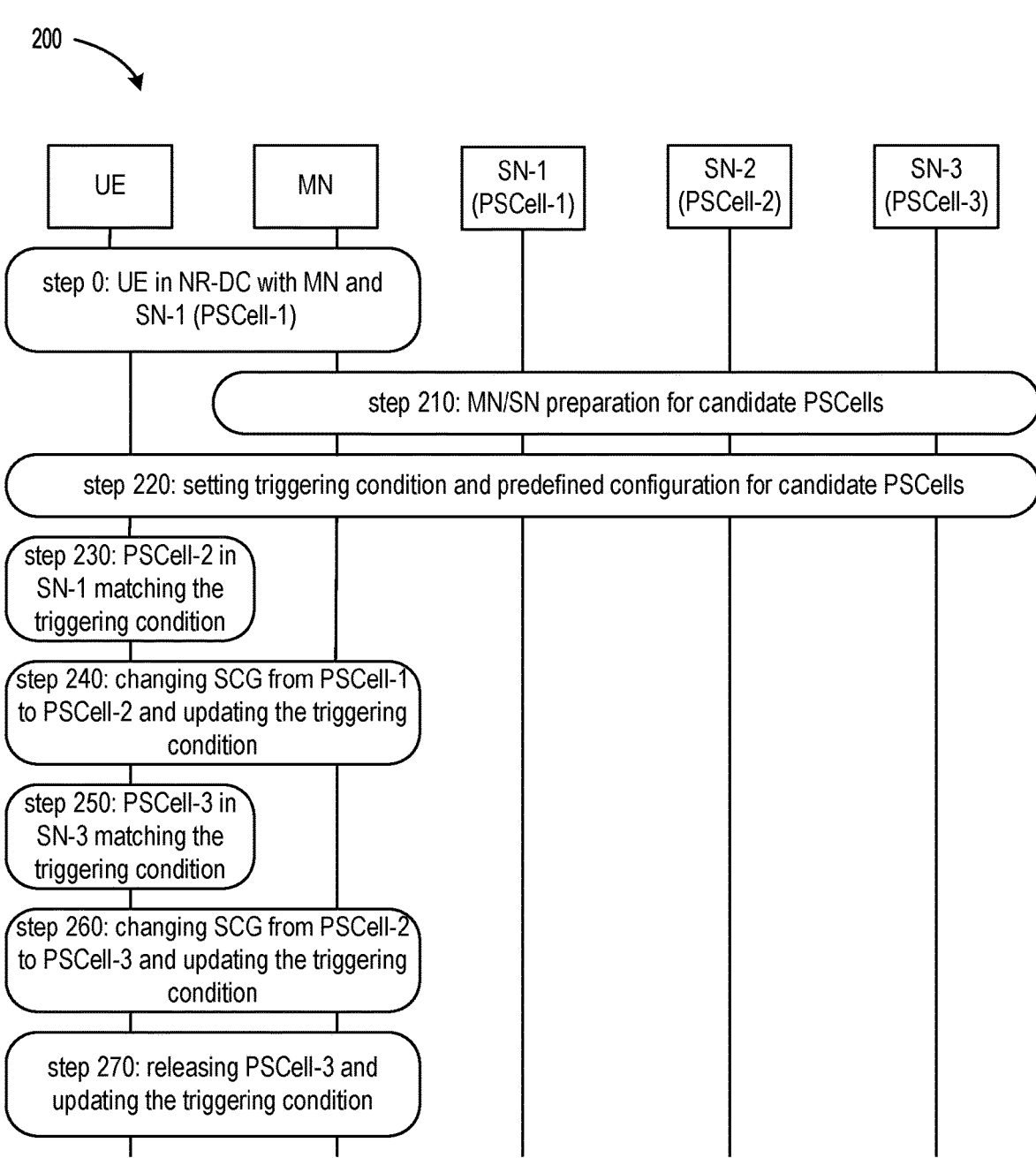

200

UE          MN          SN-1 (PSCell-1)          SN-2 (PSCell-2)          SN-3 (PSCell-3)

step 0: UE in NR-DC with MN and SN-1 (PSCell-1)

step 210: MN/SN preparation for candidate PSCells step 220: setting triggering condition and predefined configuration for candidate PSCells step 230: PSCell-2 in SN-1 matching the triggering condition step 240: changing SCG from PSCell-1 to PSCell-2 and updating the triggering condition step 250: PSCell-3 in SN-3 matching the triggering condition step 260: changing SCG from PSCell-2 to PSCell-3 and updating the triggering condition step 270: releasing PSCell-3 and updating the triggering condition

METHODS AND APPARATUS TO ACTIVATE SECONDARY CELL GROUP (SCG) SELECTIVELY

CROSS-REFERENCE TO RELATED APPLICATIONS

This application claims the benefit of U.S. Provisional Application No. 63/369,976, "Methods and apparatus to activate SCG selectively" filed on Aug. 1, 2022, which is incorporated herein by reference in its entirety.

TECHNICAL FIELD

The present disclosure relates to wireless communications, and, more particularly, to methods and apparatus to activate secondary cell group (SCG) selectively.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

With the rapid development in wireless communication for cellular wireless communication systems, such as fifth-generation (5G) New Radio (NR), which is designed to provide various configurations to improve the network services, including a variety of use cases, such as enhanced Mobile Broadband (eMBB), massive Machine-Type Communication (mMTC), Ultra-Reliable and Low-Latency Communication (URLLC), etc., efforts have been made to improve data rate, latency, reliability, mobility, etc. of the 5G NR.

DC (Dual Connectivity) architecture was introduced in LTE Release 12 to increase throughput for UE. This architecture allows User Equipment (UE) to utilize radio resource of two nodes: Master Node (MN) and Secondary Node (SN). Multi-Radio Access Technology (RAT) Dual Connectivity (MR-DC) architecture was further introduced in 5G. Under MR-DC architecture, UE can use radio resources provided by different RATs. With MR-DC, MN functions as a controlling entity, utilizing SN for additional data capacity. For example, MR-DC configurations can include New Radio Dual Connectivity (NR-DC), E-UTRA-NR Dual Connectivity (EN-DC), NG-RAN-E-UTRA Dual Connectivity (NGEN-DC) and NR-E-UTRA Dual Connectivity (NE-DC).

SUMMARY

Aspects of the disclosure provide a method to activate secondary cell group (SCG) selectively. For example, the method can include: receiving and storing, at user equipment (UE), a radio resource control (RRC) reconfiguration message from a source base station (B S), the RRC reconfiguration message including a first radio resource configuration of a first primary secondary cell (PSCell) in a first target BS, a second radio resource configuration of a second PSCell in a second target BS and conditional PSCell addition (CPA) and conditional PSCell change (CPC) triggering conditions associated with the first and second PSCells, the CPA and CPC triggering conditions corresponding to CPA and CPC steps, respectively; setting a current triggering condition to be the CPA triggering condition; evaluating the current triggering condition for the first and second PSCells based on the current triggering condition and determining that the first PSCell satisfies the current triggering condition; performing the CPA step to add the first PSCell as a current secondary cell group (SCG), applying the first radio resource configuration for the first PSCell, and synchronizing to the first PSCell; updating the current triggering condition to be the CPC triggering condition, the UE still keeping the first radio resource configuration of the first PSCell, the second radio resource configuration of the second PSCell and the CPA and CPC triggering conditions, without releasing the second radio resource configuration of the second PSCell and the CPA and CPC triggering conditions associated therewith; evaluating the current triggering condition for the second PSCell based on the current triggering condition and determining that the second PSCell satisfies the current triggering condition; and performing the CPC step to change the current SCG from the first PSCell to the second PSCell.

In an embodiment, the method can further include releasing the second PSCell, and updating the current triggering condition to be the CPA triggering condition. In another embodiment, the CPA triggering condition can be used before the current SCG is configured with the UE, and the CPC triggering condition can be used after the current SCG is configured with the UE.

For example, the CPA triggering condition can include an event indicating that the first PSCell becomes better than a threshold. As another example, the CPC triggering condition can include an event indicating that the second PSCell becomes offset better than the first PSCell. As yet another example, the CPC triggering condition can include an event indicating that the first PSCell is worse than a first threshold and the second PSCell becomes better than a second threshold.

Aspects of the present disclosure also provide an apparatus, the apparatus comprising circuitry configured to perform a method, the method including the following steps of: receiving and storing a radio resource control (RRC) reconfiguration message from a source base station (BS), the RRC reconfiguration message including a first radio resource configuration of a first primary secondary cell (PSCell) in a first target BS, a second radio resource configuration of a second PSCell in a second target BS and conditional PSCell addition (CPA) and conditional PSCell change (CPC) triggering conditions associated with the first and second PSCells, the CPA and CPC triggering conditions corresponding to CPA and CPC steps, respectively; setting a current triggering condition to be the CPA triggering condition; evaluating the current triggering condition for the first and second PSCells based on the current triggering condition and determining that the first PSCell satisfies the current triggering condition; performing the CPA step to add the first PSCell as a current secondary cell group (SCG), applying the first radio resource configuration for the first PSCell, and synchronizing to the first PSCell; updating the current triggering condition to be the CPC triggering condition, the circuitry still keeping the first radio resource configuration of the first PSCell, the second radio resource configuration of the second PSCell and the CPA and CPC triggering conditions, without releasing the second radio resource configuration of the second PSCell and the CPA and CPC triggering conditions associated therewith; evaluating the current triggering condition for the second PSCell based on the current triggering condition and determining that the second PSCell satisfies the current triggering condition; and performing the CPC step to change the current SCG from the first PSCell to the second PSCell.

Aspects of the present disclosure further provide a non-transitory machine-readable storage medium, storing instructions which, when executed by a processor, causes the processor to execute a method, the method comprising the following steps of: receiving and storing a radio resource control (RRC) reconfiguration message from a source base station (BS), the RRC reconfiguration message including a first radio resource configuration of a first primary secondary cell (PSCell) in a first target BS, a second radio resource configuration of a second PSCell in a second target BS and conditional PSCell addition (CPA) and conditional PSCell change (CPC) triggering conditions associated with the first and second PSCells, the CPA and CPC triggering conditions corresponding to CPA and CPC steps, respectively; setting a current triggering condition to be the CPA triggering condition; evaluating the current triggering condition for the first and second PSCells based on the current triggering condition and determining that the first PSCell satisfies the current triggering condition; performing the CPA step to add the first PSCell as a current secondary cell group (SCG), applying the first radio resource configuration for the first PSCell, and synchronizing to the first PSCell; updating the current triggering condition to be the CPC triggering condition, the non-transitory machine-readable storage medium still keeping the first radio resource configuration of the first PSCell, the second radio resource configuration of the second PSCell and the CPA and CPC triggering conditions, without releasing the second radio resource configuration of the second PSCell and the CPA and CPC triggering conditions associated therewith; evaluating the current triggering condition for the second PSCell based on the current triggering condition and determining that the second PSCell satisfies the current triggering condition; and performing the CPC step to change the current SCG from the first PSCell to the second PSCell.

BRIEF DESCRIPTION OF THE DRAWINGS

Various embodiments of this disclosure that are proposed as examples will be described in detail with reference to the following figures, wherein like numerals reference like elements, and wherein:

FIG. 1 illustrates a flow of an exemplary conditional reconfiguration procedure according to some embodiments of the present disclosure;

FIG. 2 illustrates a flow of another exemplary conditional reconfiguration procedure according to some embodiments of the present disclosure;

DETAILED DESCRIPTION OF EMBODIMENTS

Figure 3:
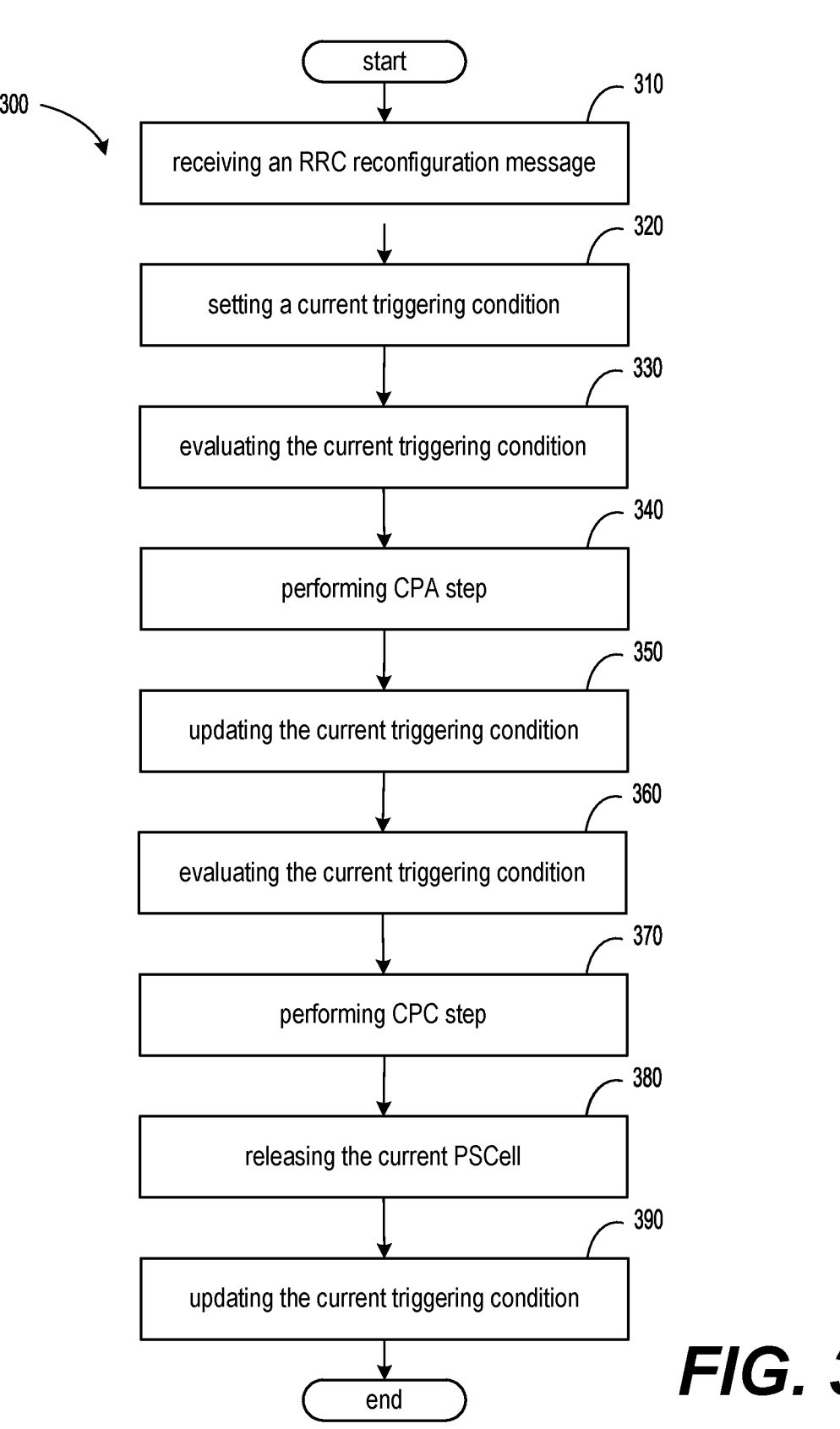
FIG. 3 is a flow chart of an exemplary conditional reconfiguration method according to some embodiments of the present disclosure.

In DC architecture, UE can utilize radio resources of two RAN nodes: MN and SN. MN and SN can be implemented by an evolved Node B (eNB) as specified in 3GPP LTE standards and/or a next generation Node B (gNB) as specified in 3GPP NR standards. In an embodiment, both the MN and SN can be implemented by the eNBs. In another embodiment, both the MN and SN can be implemented by the gNBs. In another embodiment, the MN and SN can be implemented by the eNB and gNB, respectively. In another embodiment, the MN and SN can be implemented by the gNB and eNB, respectively. Accordingly, under the DC architecture, the UE can use radio resources provided by different RATs.

In a wireless communication system performing DC-connectivity operations, a UE may perform DC operations with three base stations (BSs), one of which may function as an MN (i.e., a source BS) and the others of which may function as SNs (i.e., candidate or target BSs), e.g., SN-1 and SN-2. The serving cell(s) belonging to the MN is referred to as Master Cell Group (MCG), while the serving cells belonging to the SNs are referred to as Secondary Cell Group (SCG).

The 3GPP, in Release 16, has introduced conditional handover (CHO) and intra-SN Conditional Primary Secondary Cell (PSCell) Change (CPC), in order to improve reliability of the overall handover procedure, which may be viewed as a supplementary procedure to the conventional handover procedure to help reduce the handover failure rate. The 3GPP, in Release 17, has further introduce conditional PSCell addition (CPA) and inter-SN CPC, as part of MR-DC enhancements.

A conditional reconfiguration procedure (e.g., CHO, CPC and CPA) can be executed by the UE when one or more execution conditions (also referred to as triggering conditions) are met. In Release 16, the triggering condition for CPC can be based on event A3 (neighbor becomes offset better than SPCell) and event A5 (SPCell becomes worse than threshold 1 and neighbor becomes better than threshold 2). In Release 17, the triggering condition for CPA and MN-initial inter-SN CPC can be based on event A4 (neighbor becomes better than threshold).

The basic flow of the conditional reconfiguration procedure can be illustrated as follows: the network (e.g., the MN) sends to the UE a radio resource control (RRC) reconfiguration message that includes a predefined conditional reconfiguration, including, for example, radio resource configurations of PCell/PSCells of candidate cells (e.g., PSCell-1 in SN-1 and PSCell-2 in SN-2) and triggering conditions associated therewith; whiling maintaining connection with the MN, the UE starts evaluating the triggering condition for the candidate PCell/PSCells in SN-1 and SN-2; if at least one candidate PCell/PSCell (the PSCell-1 in SN-1, for example) satisfies the corresponding triggering condition, the UE may detach from the MN (i.e., the source BS), apply the stored predefined conditional reconfiguration for the corresponding selected PSCell-1 in SN-1 (i.e., the configuration of the PSCell-1), and synchronize to the selected PSCell-1 in SN-1; and the UE releases the other candidate PCell/PSCells and their corresponding predefined conditional reconfigurations (CPC/CPA reconfigurations, e.g., the configuration of the PSCell-2 and its associated triggering condition).

Since the other candidate PSCells (e.g., the PSCell-2) and their corresponding predefined conditional reconfigurations (e.g., the configuration of the PSCell-2 and its associated triggering condition) are released and no longer stored in the UE, the UE does not have any chance to perform a subsequent conditional reconfiguration procedure (e.g., a subsequent CPC/CPA, or called selective SCG activity) without additional CPC/CPA reconfiguration from the network, which will increase the delay for the cell change and the signaling overhead, especially in the case of frequent SCG changes while operating in 5G frequency range 2 (FR2) small cells.

Aspects of the present disclosure provide methods and apparatuses that can perform subsequent CPC/CPA after SCG change without reconfiguration from the network, in order to reduce the signaling overhead and interrupting time for SCG change. In an embodiment, the subsequent CPC/CPA can be modeled as selective SCG activation where the network has configured multiple candidate SCGs and only one SCG is activated at a time. 3GPP TSG-RAN WG2 Meeting #121 agrees a baseline procedure to support subsequent secondary cell group change (if UE keeps all configurations or if those are indicated by the network):

Step 1: when the execution condition of a CPC candidate PSCell is met, a UE performs the execution of CPC towards this candidate PSCell;

Step 2: after finishing the PSCell addition or change, the UE does not release conditional configuration of other candidate PSCells for subsequent CPC, and the UE continues evaluating the execution conditions of other candidate PSCells; and Step 3: when the execution condition of a candidate PSCell is met, the UE performs the execution of CPC towards this candidate PSCell.

FIG. 1 illustrates a flow of an exemplary conditional reconfiguration procedure 100 (or method) according to some embodiments of the present disclosure. Before the conditional reconfiguration procedure 100 begins, a UE can be deployed in a NR Standalone (SA) network and no SCG is configured with the UE, at step 0. The conditional reconfiguration procedure 100 starts at step 110.

At step 110, MN/SN can prepare for candidate PSCells. For example, the network prepares one or more PSCells for later PSCell addition and PSCell change. In an embodiment, a source BS (MN) can configure the UE to measure qualities of one or more candidate PSCells in at least one source BS (SN), e.g., PSCell-1 in SN-1, PSCell-2 in SN-2 and PSCell-3 in SN-3. In response, the UE can measure the qualities of PSCell-1, PSCell-2 and PSCell-3 and report the measured qualities to the MN. For example, the measured qualities can be reference signal received power (RSRP), reference signal received quality (RSRQ), signal to interference and noise ratio (SINR), etc. The MN can determine one or more target PSCells, e.g., PSCell-1, PSCell-2 and PSCell-3, from the candidate PSCells based on the measurement report. In an embodiment, the MN can have a predefined condition for each of the candidate PSCells, and, accordingly, the one or more target PSCells can be determined from the PSCells whose corresponding predefined conditions are satisfied.

Then, the MN can transmit an SN addition request message to at least one target BS (SN), e.g., SN-1, SN-2 and SN-3. The SN addition request message can request SN-1 to SN-3 to provide radio resource configurations of the candidate PSCells, e.g., PSCell-1, PSCell-2 and PSCell-3. In response, SN-1, SN-2 and SN-3 can transmit an SN addition request acknowledgement (ACK) message to the MN. The SN addition request ACK message indicates to the MN that the SN addition request message has been received. The conditional reconfiguration procedure 100 may proceed to step 120.

At step 120, triggering conditions and predefined configurations for candidate PSCells are set. For example, the network can configure predefined reconfiguration and triggering condition for each candidate PSCell. In an embodiment, the MN can transmit a radio resource control (RRC) reconfiguration message to the UE. The RRC reconfiguration message carries an SN RRC reconfiguration message that indicates the radio resource configuration of candidate PSCells, e.g., PSCell-1, PSCell-2 and PSCell-3, and triggering conditions associated therewith. In an embodiment, the triggering conditions can include cond-1-CPA (triggering condition for CAP) and cond-2-CPC (triggering condition for CPC). For example, cond-1-CPA can be based on events A3 and A5. As another example, cond-2-CPC can be based on event A4. In response, the UE can transmit an RRC reconfiguration complete message to the MN. The RRC reconfiguration complete message carries an SN RRC reconfiguration complete message that indicates the radio resource configurations in SN-1, SN-2 and SN-3 have been configured with the UE.

In an embodiment, the UE can set a current triggering condition to be either cond-1-CPA or cond-2-CPC and candidate PSCells to be all or some of PSCell-1, PSCell-2 and PSCell-3 based on whether it has any of PSCell-1, PSCell-2 and PSCell-3 added. In the exemplary embodiment, the current triggering condition is set to be cond-1-CPA and the candidate PSCells are set to be PSCell-1, PSCell-2 and PSCell-3, as none of PSCell-1, PSCell-2 and PSCell-3 is added to the UE. The conditional reconfiguration procedure 100 may proceed to step 130.

At step 130, one of PSCell-1 in SN-1, PSCell-2 in SN-2 and PSCell-3 in SN-3, e.g., PSCell-1 in SN-1, matches the current triggering condition. For example, the UE evaluates the current triggering condition, i.e., cond-1-CPA, and finds out PSCell-1 that matches the current triggering condition. In an embodiment, the UE, while maintaining connection with the MN, can evaluate the current triggering condition, i.e., cond-1-CPA, for the candidate PSCell-1, PSCell-2 and PSCell-3, and determine that PSCell-1 satisfies the current triggering condition (e.g., event A4). The conditional reconfiguration procedure 100 may proceed to step 140.

At step 140, the matched PSCell, e.g., PSCell-1, is added as a current SCG and the current triggering condition is updated. For example, the UE performs PSCell-1 addition, e.g., performing a random access channel (RACH) procedure and sending a complete message, and then updates the current triggering condition. For example, the UE may detach from the MN, apply the stored configuration for PSCell-1 in SN-1, and synchronize to the selected PSCell-1 in SN-1. After finishing the CPA, in order for subsequent CPC, the UE still keeps the predefined reconfiguration and triggering condition for each candidate PSCell stored therein, i.e., without releasing the other (remaining) candidate PSCells, e.g., PSCell-2 and PSCell-3, and their corresponding configurations and associated triggering conditions. In an embodiment, the current triggering condition can be updated to be cond-2-CPC for subsequent CPC when the UE still maintains connection with PSCell-1. The conditional reconfiguration procedure 100 may proceed to step 150.

At step 150, one of the remaining candidate PSCells (i.e., PSCell-2 and PSCell-3), e.g., PSCell-2, matches the current triggering condition. For example, the UE evaluates the current triggering condition, i.e., cond-2-CPC, and finds out PSCell-2 that matches the current triggering condition. In an embodiment, the UE, while maintaining connection with PSCell-1, can evaluate the current triggering condition, i.e., cond-2-CPC, for the remaining candidate PSCell-2 and PSCell-3 (the evaluation of the current triggering condition for PSCell-1 can be ignored, as the UE still maintains connection with PSCell-1), and determine that PSCell-2 satisfies the current triggering condition (e.g., event A3 or A5). The conditional reconfiguration procedure 100 may proceed to step 160.

At step 160, the matched PSCell, e.g., PSCell-2, is changed as the current SCG and the current triggering condition is updated. For example, the UE performs PSCell-2 change, e.g., performing the RACH procedure and sending a complete message, and then updates the current triggering condition. For example, the UE may detach from the PSCell-1, apply the stored configuration for PSCell-2 in SN-2, and synchronize to the selected PSCell-2 in SN-2. After finishing the CPC, in order for subsequent CPC, the UE still keeps the predefined reconfiguration and triggering condition for each candidate PSCell stored therein, i.e., without releasing the other (remaining) candidate PSCells, e.g., PSCell-1 and PSCell-3, and their corresponding configurations and associated triggering conditions. In an embodiment, the current triggering condition can be updated to be cond-2-CPC for subsequent CPC when the UE still maintains connection with PSCell-2. The conditional reconfiguration procedure 100 may proceed to step 170.

At step 170, the current SCG is released and the current triggering condition is updated. For example, the network can release PSCell-2, and the current triggering condition is updated to cond-1-CPA. After released, the UE still keeps the predefined reconfiguration and triggering condition for each candidate PSCell stored therein, i.e., without releasing the candidate PSCells, e.g., PSCell-1, PSCell-2 and PSCell-3, and their corresponding configurations and associated triggering conditions, in order for subsequent CPA/CPC. The conditional reconfiguration procedure 100 may return to step 130 for subsequent CPA/CPC.

FIG. 2 illustrates a flow of an exemplary conditional reconfiguration procedure 200 (or method) according to some embodiments of the present disclosure. The conditional reconfiguration procedure 200 differs from the conditional reconfiguration procedure 100 in that before the conditional reconfiguration procedure 200 begins, the UE is already deployed in NR-DC network and the MN and PSCell-1 are configured with the UE. The conditional reconfiguration procedure 100 starts at step 210.

At step 210, MN/SN can prepare for candidate PSCells. For example, the network prepares one or more PSCells for later PSCell change. In an embodiment, the MN can have a predefined condition for each of the candidate PSCells, and, accordingly, the one or more target PSCells can be selected from the PSCells whose corresponding predefined conditions are satisfied. The conditional reconfiguration procedure 200 may proceed to step 220.

At step 220, triggering conditions and predefined configurations for candidate PSCells are set. For example, the network can configure predefined reconfiguration and triggering condition for each candidate PSCell, e.g., PSCell-2 and PSCell-3, and triggering conditions associated therewith. In an embodiment, the triggering conditions can include cond-1-CPA (triggering condition for CAP) and cond-2-CPC (triggering condition for CPC). For example, cond-1-CPA can be based on events A3 and A5. As another example, cond-2-CPC can be based on event A4. In an embodiment, the UE can set a current triggering condition to be either cond-1-CPA or cond-2-CPC and candidate PSCells to be all or some of PSCell-1, PSCell-2 and PSCell-3. In the exemplary embodiment, the current triggering condition is set to be cond-2-CPC and the candidate PSCells are set to be PSCell-2 and PSCell-3, as the UE is maintaining connection with PSCell-1. The conditional reconfiguration procedure 200 may proceed to step 230.

At step 230, one of PSCell-2 and PSCell-3, e.g., PSCell-2, matches the current triggering condition. For example, the UE evaluates the current triggering condition, i.e., cond-2-CPC, and finds out PSCell-2 that matches the current triggering condition. In an embodiment, the UE, while maintaining connection with PSCell-1, can evaluate the current triggering condition, i.e., cond-2-CPC, for PSCell-2 and PSCell-3 (the evaluation of the current triggering condition for PSCell-1 can be ignored, as the UE still maintains connection with PSCell-1), and determine that PSCell-2 satisfies the current triggering condition (e.g., event A3 or A5). The conditional reconfiguration procedure 200 may proceed to step 260.

At step 240, the matched PSCell, e.g., PSCell-2, is changed as the current SCG and the current triggering condition is updated. For example, the UE performs PSCell-2 change, e.g., performing the RACH procedure and sending a complete message, and then updates the current triggering condition. For example, the UE may detach from the PSCell-1, apply the stored configuration for PSCell-2 in SN-2, and synchronize to the selected PSCell-2 in SN-2. After finishing the CPC, in order for subsequent CPC, the UE still keeps the predefined reconfiguration and triggering condition for each candidate PSCell stored therein, i.e., without releasing the other (remaining) candidate PSCells, e.g., PSCell-1 and PSCell-3, and their corresponding configurations and associated triggering conditions. In an embodiment, the current triggering condition can be updated to be cond-2-CPC for subsequent CPC when the UE still maintains connection with PSCell-2. The conditional reconfiguration procedure 200 may proceed to step 250.

At step 250, another one of the remaining candidate PSCells (i.e., PSCell-1 and PSCell-3), e.g., PSCell-3, matches the current triggering condition. In an embodiment, the UE, while maintaining connection with PSCell-2, can evaluate the current triggering condition, i.e., cond-2-CPC, for PSCell-1 and PSCell-3 (the evaluation of the current triggering condition for PSCell-2 can be ignored, as the UE still maintains connection with PSCell-1), and determine that PSCell-3 satisfies the current triggering condition (e.g., event A3 or A5). The conditional reconfiguration procedure 200 may proceed to step 260.

At step 260, the matched PSCell, e.g., PSCell-3, is changed as the current SCG and the current triggering condition is updated. For example, the UE performs PSCell-3 change, e.g., performing the RACH procedure and sending a complete message, and then updates the current triggering condition. For example, the UE may detach from the PSCell-2, apply the stored configuration for PSCell-3 in SN-3, and synchronize to the selected PSCell-3 in SN-3. After finishing the CPC, in order for subsequent CPC, the UE still keeps the predefined reconfiguration and triggering condition for each candidate PSCell stored therein, i.e., without releasing the other (remaining) candidate PSCells, e.g., PSCell-1 and PSCell-2, and their corresponding configurations and associated triggering conditions. In an embodiment, the current triggering condition can be updated to be cond-2-CPC for subsequent CPC when the UE still maintains connection with PSCell-3. The conditional reconfiguration procedure 200 may proceed to step 270.

At step 170, the current SCG is released and the current triggering condition is updated. For example, the network can release PSCell-3, and the current triggering condition is updated to cond-1-CPA. After released, the UE still keeps the predefined reconfiguration and triggering condition for each candidate PSCell stored therein, i.e., without releasing the candidate PSCells, e.g., PSCell-1, PSCell-2 and PSCell- 3, and their corresponding configurations and associated triggering conditions, in order for subsequent CPA/CPC. The conditional reconfiguration procedure 200 may return to step 230 for subsequent CPA/CPC.

FIG. 3 is a flow chart of an exemplary conditional reconfiguration method 300 according to some embodiments of the present disclosure. The conditional reconfiguration method 300 can be associated with the conditional reconfiguration methods 100 and 200. In various embodiments, some of the steps of the conditional reconfiguration method 300 shown can be performed concurrently or in a different order than shown, can be substituted by other method steps, or can be omitted. Additional method steps can also be performed as desired.

At step 310, a radio resource control (RRC) reconfiguration message from a source BS (e.g., the MN) is received at the UE. In an embodiment, the RRC reconfiguration message can include a first radio resource configuration of a first PSCell (e.g., PSCell-1) in a first target BS (e.g., SN-1), a second radio resource configuration of a second PSCell (e.g., PSCell-2) in a second target BS (e.g., SN-1) and CPA and CPC triggering conditions (e.g., cond-1-CPA and cond-2-CPC) associated with the first and second PSCells. The CPA and CPC triggering conditions correspond to CPA and CPC steps, respectively.

At step 320, a current triggering condition is set to be the CPA triggering condition (e.g., cond-1-CPA).

At step 330, the current triggering condition are evaluated for the first and second PSCells based on the current triggering condition and it is determined that the first PSCell satisfies the current triggering condition.

At step 340, the CPA step is performed to add the first PSCell as a current SCG, the first radio resource configuration for the first PSCell is applied, and the UE is synchronized to the first PSCell.

At step 350, the current triggering condition is updated to be the CPC triggering condition (e.g., cond-2-CPC), the UE still keeping the first radio resource configuration of the first PSCell, the second radio resource configuration of the second PSCell and the CPA and CPC triggering conditions, without releasing the second radio resource configuration of the second PSCell and the CPA and CPC triggering conditions associated therewith.

At step 360, the current triggering condition is evaluated for the second PSCell based on the current triggering condition and it is determined that the second PSCell satisfies the current triggering condition.

At step 370, the CPC step is performed to change the current SCG from the first PSCell to the second PSCell.

At step 380, the second PSCell is released.

At step 390, the current triggering condition is updated to be the CPA triggering condition.

Figure 4:
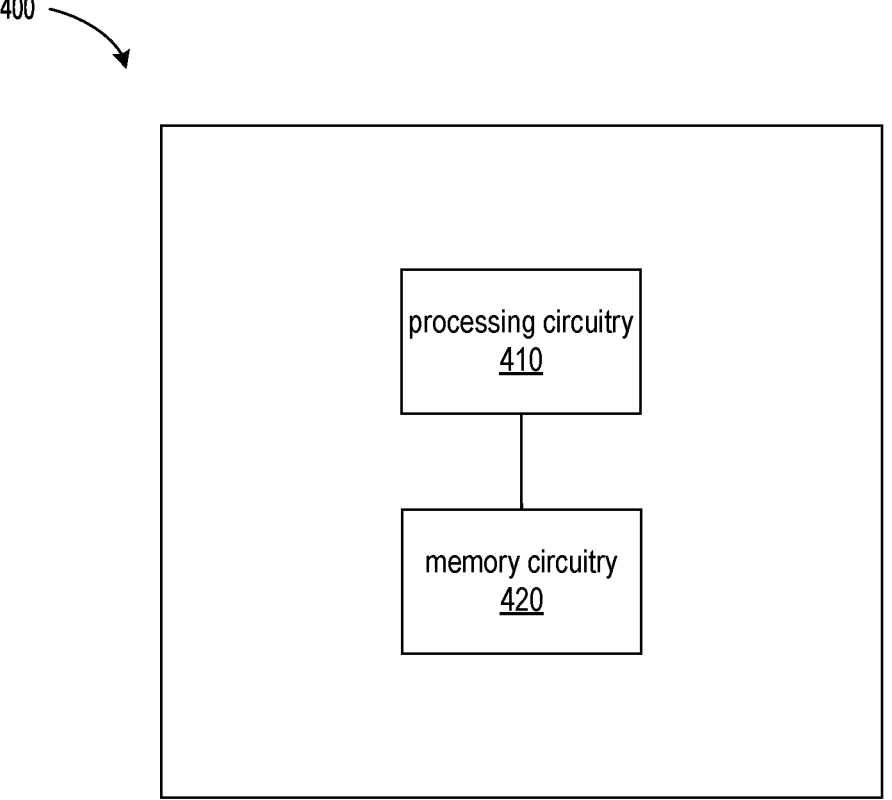
FIG. 4 is a functional block diagram of an apparatus used to implement the conditional reconfiguration procedures and method according to some embodiments of the present disclosure.

FIG. 4 is a functional block diagram of an exemplary apparatus, e.g., the UE, according to some embodiments of the present disclosure. The apparatus 400 can be used to implement the conditional reconfiguration methods 100-300. The apparatus 400 can include circuitry, e.g., processing circuitry 410 and memory circuitry 420, that is configured to perform a method that includes the steps of: receiving and storing an RRC reconfiguration message from a source BS, the RRC reconfiguration message including a first radio resource configuration of a first PSCell in a first target BS, a second radio resource configuration of a second PSCell in a second target BS and CPA and CPC triggering conditions associated with the first and second PSCells, the CPA and CPC triggering conditions corresponding to CPA and CPC steps, respectively; setting a current triggering condition to be the CPA triggering condition; evaluating the current triggering condition for the first and second PSCells based on the current triggering condition and determining that the first PSCell satisfies the current triggering condition; performing the CPA step to add the first PSCell as a current SCG, applying the first radio resource configuration for the first PSCell, and synchronizing to the first PSCell; updating the current triggering condition to be the CPC triggering condition, the UE still keeping the first radio resource configuration of the first PSCell, the second radio resource configuration of the second PSCell and the CPA and CPC triggering conditions, without releasing the second radio resource configuration of the second PSCell and the CPA and CPC triggering conditions associated therewith; evaluating the current triggering condition for the second PSCell based on the current triggering condition and determining that the second PSCell satisfies the current triggering condition; and performing the CPC step to change the current SCG from the first PSCell to the second PSCell. In an embodiment, the method can further include releasing the second PSCell, and updating the current triggering condition to be the CPA triggering condition.

Aspects of the present disclosure also provide a non-transitory machine-readable storage medium. The non-transitory machine-readable storage medium can store instructions which, when executed by a processor, causes the processor to execute a method. In an embodiment, the method can include the following steps of: receiving and storing an RRC reconfiguration message from a source BS, the RRC reconfiguration message including a first radio resource configuration of a first PSCell in a first target BS, a second radio resource configuration of a second PSCell in a second target BS and CPA and CPC triggering conditions associated with the first and second PSCells, the CPA and CPC triggering conditions corresponding to CPA and CPC steps, respectively; setting a current triggering condition to be the CPA triggering condition; evaluating the current triggering condition for the first and second PSCells based on the current triggering condition and determining that the first PSCell satisfies the current triggering condition; performing the CPA step to add the first PSCell as a current SCG, applying the first radio resource configuration for the first PSCell, and synchronizing to the first PSCell; updating the current triggering condition to be the CPC triggering condition, the non-transitory machine-readable storage medium still keeping the first radio resource configuration of the first PSCell, the second radio resource configuration of the second PSCell and the CPA and CPC triggering conditions, without releasing the second radio resource configuration of the second PSCell and the CPA and CPC triggering conditions associated therewith; evaluating the current triggering condition for the second PSCell based on the current triggering condition and determining that the second PSCell satisfies the current triggering condition; and performing the CPC step to change the current SCG from the first PSCell to the second PSCell. In an embodiment, the method can further include releasing the second PSCell, and updating the current triggering condition to be the CPA triggering condition.

In the context of the present disclosure, the term "non-transitory," as used herein, is a limitation of the medium itself (i.e., tangible, not a signal) as opposed to a limitation on data storage persistency (e.g., RAM vs. ROM)." In an embodiment, the non-transitory machine-readable storage medium may be any tangible medium that may contain or store a program for use by or in connection with an instruction execution system, apparatus, or device. The machine-readable storage medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving and storing, at user equipment (UE), a radio resource control (RRC) reconfiguration message from a source base station (BS), the RRC reconfiguration message including a first radio resource configuration of a first primary secondary cell (PSCell) in a first target BS, a second radio resource configuration of a second PSCell in a second target BS and conditional PSCell addition (CPA) and conditional PSCell change (CPC) triggering conditions associated with the first and sec-ond PSCells, the CPA and CPC triggering conditions corresponding to CPA and CPC steps, respectively;
setting a current triggering condition to be the CPA triggering condition;
evaluating the current triggering condition for the first and second PSCells based on the current triggering condition and determining that the first PSCell satisfies the current triggering condition;
performing the CPA step to add the first PSCell as a current secondary cell group (SCG), applying the first radio resource configuration for the first PSCell, and synchronizing to the first PSCell;
updating the current triggering condition to be the CPC triggering condition, the UE still keeping the first radio resource configuration of the first PSCell, the second radio resource configuration of the second PSCell and the CPA and CPC triggering conditions, without releasing the second radio resource configuration of the second PSCell and the CPA and CPC triggering conditions associated therewith;
evaluating the current triggering condition for the second PSCell based on the current triggering condition and determining that the second PSCell satisfies the current triggering condition; and
performing the CPC step to change the current SCG from the first PSCell to the second PSCell.

2. The method of claim 1, further comprising:
releasing the second PSCell; and
updating the current triggering condition to be the CPA triggering condition.

3. The method of claim 1, wherein the CPA triggering condition includes an event indicating that the first PSCell becomes better than a threshold.

4. The method of claim 1, wherein the CPC triggering condition includes an event indicating that the second PSCell becomes offset better than the first PSCell.

5. The method of claim 1, wherein the CPC triggering condition includes an event indicating that the first PSCell is worse than a first threshold and the second PSCell becomes better than a second threshold.

6. The method of claim 1, wherein the CPA triggering condition is used before the current SCG is configured with the UE, and the CPC triggering condition is used after the current SCG is configured with the UE.

7. An apparatus, comprising circuitry configured to perform a method, the method including the following steps of:
receiving and storing a radio resource control (RRC) reconfiguration message from a source base station (BS), the RRC reconfiguration message including a first radio resource configuration of a first primary secondary cell (PSCell) in a first target BS, a second radio resource configuration of a second PSCell in a second target BS and conditional PSCell addition (CPA) and conditional PSCell change (CPC) triggering conditions associated with the first and second PSCells, the CPA and CPC triggering conditions corresponding to CPA and CPC steps, respectively;
setting a current triggering condition to be the CPA triggering condition;
evaluating the current triggering condition for the first and second PSCells based on the current triggering condition and determining that the first PSCell satisfies the current triggering condition;
performing the CPA step to add the first PSCell as a current secondary cell group (SCG), applying the first radio resource configuration for the first PSCell, and synchronizing to the first PSCell;

updating the current triggering condition to be the CPC triggering condition, the circuitry still keeping the first radio resource configuration of the first PSCell, the second radio resource configuration of the second PSCell and the CPA and CPC triggering conditions, without releasing the second radio resource configuration of the second PSCell and the CPA and CPC triggering conditions associated therewith;

evaluating the current triggering condition for the second PSCell based on the current triggering condition and determining that the second PSCell satisfies the current triggering condition; and performing the CPC step to change the current SCG from the first PSCell to the second PSCell.

8. The apparatus of claim 7, wherein the method further comprises:

releasing the second PSCell; and updating the current triggering condition to be the CPA triggering condition.

9. The apparatus of claim 7, wherein the CPA triggering condition includes an event indicating that the first PSCell becomes better than a threshold.

10. The apparatus of claim 7, wherein the CPC triggering condition includes an event indicating that the second PSCell becomes offset better than the first PSCell.

11. The apparatus of claim 7, wherein the CPC triggering condition includes an event indicating that the first PSCell is worse than a first threshold and the second PSCell becomes better than a second threshold.

12. The apparatus of claim 7, wherein the CPA triggering condition is used before the current SCG is configured with the apparatus, and the CPC triggering condition is used after the current SCG is configured with the apparatus.

13. A non-transitory machine-readable storage medium, storing instructions which, when executed by a processor, causes the processor to execute a method, the method comprising the following steps of:

receiving and storing a radio resource control (RRC) reconfiguration message from a source base station (BS), the RRC reconfiguration message including a first radio resource configuration of a first primary secondary cell (PSCell) in a first target BS, a second radio resource configuration of a second PSCell in a second target BS and conditional PSCell addition (CPA) and conditional PSCell change (CPC) triggering conditions associated with the first and second PSCells, the CPA and CPC triggering conditions corresponding to CPA and CPC steps, respectively;

setting a current triggering condition to be the CPA triggering condition;

evaluating the current triggering condition for the first and second PSCells based on the current triggering condition and determining that the first PSCell satisfies the current triggering condition;

performing the CPA step to add the first PSCell as a current secondary cell group (SCG), applying the first radio resource configuration for the first PSCell, and synchronizing to the first PSCell;

updating the current triggering condition to be the CPC triggering condition, the non-transitory machine-readable storage medium still keeping the first radio resource configuration of the first PSCell, the second radio resource configuration of the second PSCell and the CPA and CPC triggering conditions, without releasing the second radio resource configuration of the second PSCell and the CPA and CPC triggering conditions associated therewith;

evaluating the current triggering condition for the second PSCell based on the current triggering condition and determining that the second PSCell satisfies the current triggering condition; and performing the CPC step to change the current SCG from the first PSCell to the second PSCell.

14. The non-transitory machine-readable storage medium of claim 13, wherein the method further comprises:

releasing the second PSCell; and updating the current triggering condition to be the CPA triggering condition.

15. The non-transitory machine-readable storage medium of claim 13, wherein the CPA triggering condition includes an event indicating that the first PSCell becomes better than a threshold.

16. The non-transitory machine-readable storage medium of claim 13, wherein the CPC triggering condition includes an event indicating that the second PSCell becomes offset better than the first PSCell.

17. The non-transitory machine-readable storage medium of claim 13, wherein the CPC triggering condition includes an event indicating that the first PSCell is worse than a first threshold and the second PSCell becomes better than a second threshold.

18. The non-transitory machine-readable storage medium of claim 13, wherein the CPA triggering condition is used before the current SCG is configured with an apparatus having the non-transitory machine-readable storage medium, and the CPC triggering condition is used after the current SCG is configured with the apparatus.

* * * * *